(12) United States Patent
Luo et al.

(10) Patent No.: US 12,553,206 B2
(45) Date of Patent: Feb. 17, 2026

(54) ANNULAR ANCHOR INSTALLING INSTRUMENT AND ANNULAR ANCHOR INSTALLING METHOD

(71) Applicant: CHINA THREE GORGES CORPORATION, Hubei (CN)

(72) Inventors: Lunbo Luo, Hubei (CN); Changping Sun, Hubei (CN); Xiao Lei, Hubei (CN); Xinqun Chen, Hubei (CN); Jianping Liu, Hubei (CN); Haijun Jin, Hubei (CN); Weihuan Zhuang, Hubei (CN); Yongpei Zheng, Hubei (CN); Sheng Lian, Hubei (CN); Yulin Deng, Hubei (CN); Juan Jiang, Hubei (CN); Jiandong Xiao, Hubei (CN); Zhiji Yue, Hubei (CN)

(73) Assignee: CHINA THREE GORGES CORPORATION (CN)

( * ) Notice: Subject to any disclaimer, the term of this patent is extended or adjusted under 35 U.S.C. 154(b) by 296 days.

(21) Appl. No.: 18/220,119

(22) Filed: Jul. 10, 2023

(65) Prior Publication Data
US 2024/0337084 A1      Oct. 10, 2024

(30) Foreign Application Priority Data
Apr. 7, 2023   (CN) .......................... 202310370978.6

(51) Int. Cl.
  *E02D 7/00*   (2006.01)
  *E02D 7/20*   (2006.01)
(52) U.S. Cl.
  CPC ........ *E02D 7/20* (2013.01); *E02D 2250/0053* (2013.01); *E02D 2250/0061* (2013.01)

(58) Field of Classification Search
  CPC .............. E02D 7/20; E02D 2250/0053; E02D 2250/0061
  See application file for complete search history.

(56) References Cited

U.S. PATENT DOCUMENTS

| | | | | |
|---|---|---|---|---|
| 6,719,496 | B1* | 4/2004 | Von Eberstein | B63B 21/22 114/296 |
| 7,527,455 | B2* | 5/2009 | Raines | B63B 21/29 405/224.1 |

(Continued)

FOREIGN PATENT DOCUMENTS

| CN | 102556284 A | 7/2012 |
|---|---|---|
| CN | 102837804 A | 12/2012 |

(Continued)

*Primary Examiner* — Kyle Armstrong (57) ABSTRACT

The present disclosure provides an annular anchor installing instrument and an annular anchor installing method, relating to the technical field of ocean engineering. The annular anchor installing instrument includes an installation tube, a pump body assembly, a lifting portion and an installation portion. One end of the installation tube is provided with a cover body, and the other end of the installation tube is configured to be an open end for cooperating with the top of the annular anchor. The pump body assembly is arranged on the cover body, and used to vacuum the interior of the installation tube. The lifting portion is arranged on the cover body, and used to connect with a hoist. The installation portions are removably arranged on the cover body, and used to connect with the hoist and the anchor chain of the annular anchor, respectively.

18 Claims, 6 Drawing Sheets

(56) References Cited

U.S. PATENT DOCUMENTS

2007/0140796 A1\* 6/2007 Alhayari ................ B63B 21/27
                                                                                                 405/224.1
2016/0289911 A1\* 10/2016 Han ........................ E02D 23/04

FOREIGN PATENT DOCUMENTS

| CN | 105178325 | A | | 12/2015 | | |
|----|-----------|---|---|---------|---|---|
| CN | 105926627 | A | | 9/2016 | | |
| CN | 110185408 | A | | 8/2019 | | |
| CN | 114475919 | A | | 5/2022 | | |
| KR | 20150049172 | A | \* | 5/2015 | ............. | E02B 17/00 |
| KR | 20220100336 | A | \* | 7/2022 | ........... | E02D 27/525 |

\* cited by examiner

ANNULAR ANCHOR INSTALLING INSTRUMENT AND ANNULAR ANCHOR INSTALLING METHOD

CROSS-REFERENCE TO RELATED APPLICATION

This application claims priority from the Chinese patent application 2023103709786 filed Apr. 7, 2023, the content of which is incorporated herein in the entirety by reference.

TECHNICAL FIELD

The present disclosure relates to the technical field of ocean engineering, in particular to an annular anchor installing instrument and an annular anchor installing method.

BACKGROUND

With the gradual development of offshore wind farms and offshore oil exploitation fields toward deep sea, floating anchoring foundations in various forms have been widely applied and spread, mainly including a drag flatten anchor, a suction anchor and a dynamic anchor. Among them, the suction anchor is widely used due to its convenient construction, high cost performance, recyclability and other advantages.

The suction anchor typically has a cylindrical body closed at the upper end and opened at the lower end, due to its own structural properties, the suction anchor can only reach the seabed surface during the descent, but the closed structure at the upper end makes it difficult to move further downwards. In view of anti-erosion and big torque caused by non-coplanar loads, a late-model anchor body structure has been designed, that is, an annular anchor body opened at its upper and lower ends, which is installed to a certain depth below the seabed to take advantage of the high load-bearing strength of deeper soil body. However, the installation of annular anchors is a tricky problem, if mechanical vibration is adopted to penetrate the annular anchor below the seabed, the installation is slow in speed with low efficiency, and due to the restriction of mechanical vibration equipment, the annular anchor cannot reach a deeper position with high limitation.

SUMMARY

Therefore, the technical problem to be solved by the present disclosure, providing an annular anchor installing instrument and an annular anchor installing method, is to overcome the defect of the prior art that: if mechanical vibration equipment is used to install the annular anchor, the installation is slow in speed with low efficiency and high limitation.

In order to solve the above technical problem, the present disclosure provides an annular anchor installing instrument configured to cooperatively install an annular anchor opened at its upper and lower ends, comprising an installation tube, one end of which is provided with a cover body, and the other end of which is configured to be an open end for cooperating with the top of the annular anchor;
a pump body assembly arranged on the cover body, and used to vacuum the interior of the installation tube;
a lifting portion arranged on the cover body, and used to connect with a hoist; and
installation portions in multiple groups, which are removably arranged on the cover body, and used to connect with the hoist and the anchor chain of the annular anchor, respectively, so that the annular anchor is coaxially fixed to the open end of the installation tube by connecting with the anchor chain of the annular anchor.

Optionally, it further includes a constraint means, positioned at the open end of the installation tube, which is used to limit the relative movement between the annular anchor and the installation tube in the radial direction.

Optionally, the constraint means includes a constraint plate, one end of which is connected with the inner wall of the open end of the installation tube, and the other end of which is suitable for protruding into the interior of the annular anchor, so as to abut on the inner wall of the annular anchor, the constraint plates are configured to be in multiple groups, which are spaced along the circumferential direction of the installation tube.

Optionally, the end face of the open end of the installation tube and the end face of the annular anchor are butted to each other.

Optionally, the installation portion includes an installing plate, which is connected with the cover body, and on which a installation point is set;
and a lifting plate connected to the installing plate, and used to connect with a hoist.

Optionally, a winch means is set on the installation point.

Optionally, the insulating plate is removably connected with the cover body.

Optionally, the side wall of the installation tube is provided with tube connecting portions, which are arranged in multiple groups in correspondence to the installation portion.

The present disclosure provides an annular anchor installing method using the annular anchor installing instrument as any one of described above, comprising the steps of:

butting the open end of the installation tube to the top of the annular anchor, and connecting the anchor chain on the annular anchor with the installation portion on the cover body, so that the annular anchor is fixed coaxially to the open end of the installation tube;
connecting a hoist with the lifting portion on the cover body, then hoisting the annular anchor and the annular anchor installing instrument into water by means of the hoist to sink them;
during the descent, actuating the pump body assembly to drain water in the installation tube until the annular anchor is in contact with a seabed;
removing the installation portion from the cover body by means of an underwater robot, and hoisting the installation portion and the anchor chain connected to it onto the surrounding seabed by means of a hoist;
pumping water from the installation tube by means of the pump body assembly, so that the annular anchor sinks down to a designed depth of the seabed under negative pressure; and
starting the pump body assembly to fill water into the installation tube for a pressure boost, meanwhile cooperating with a hoist to pull the installation tube out of the seabed, leaving the annular anchor under the seabed.

Optionally, the hoist includes a first hoist and a second hoist, the lifting portion on the cover body is connected with the first hoist, and the lifting plate of the installation portion is connected with the second hoist;

after the underwater robot removes the installation portion from the cover body, the second hoist lifts the installation portion and the anchor chain connected to it onto the surrounding seabed.

The technical solution of the present disclosure has the following advantages:

1. The annular anchor installing instrument provided by the present disclosure is configured to cooperatively install the annular anchor opened at its upper and lower ends, the annular anchor is fixed coaxially to the open end of the installation tube by means of the anchor chain, and the pump body assemble under control achieves pumping or filling water from/into the installation tube and changes the pressure difference between the inside and outside of the installation tube, enabling the installation tube to descend and rise. The height of the installation tube can increase, avoiding the installation tube from being jammed with too high soil in the process of negative pressure penetration, and the soil from being sucked into the pump body assembly to damage the equipment resultantly. The annular anchor is sent below the seabed by means of the installation tube, achieving rapid installation under the pressure difference, which is convenient, fast and high-efficient, and the installation tube can be recycled after installation and reused.

2. The annular anchor installing instrument provided by the present disclosure also includes the constraint means, positioned at the open end of the installation tube, which is used to limit the relative movement between the annular anchor and the installation tube in the radial direction, so as to avoid misalignment in the process of the descent and installation from affecting the penetration effect.

3. In the annular anchor installing instrument provided by the present disclosure, the constraint means includes multiple groups of constraint plates, which are spaced along the circumferential direction of the installation tube, enhancing the constraint effect on the annular anchor under the abutting action of the constraint plates on the inner wall of the installation tube.

4. In the annular anchor installing instrument provided by the present disclosure, the end face of the open end of the installation tube and the end face of the annular anchor are butted to each other and reciprocally arranged, avoiding the movement of the annular anchor in its axial direction during installation, from affecting the accuracy and installation effect of the final appointed position.

5. In the annular anchor installing instrument provided by the present disclosure, the installation portion includes the installing plate and the lifting plate connected to the installing plate, which are used to bind the annular anchor and connect with a hoist, respectively; during the descent, the hoist can control the free end of the anchor chain through the control of the lifting plate and adjust the position of the anchor chain, so as to facilitate the connection between the parts to be subsequently moored and the anchor chain.

6. In the annular anchor installing instrument provided by the present disclosure, the winch means set on the installation point can receive the long anchor chain, avoiding multiple groups of anchor chains after becoming too long, from moving to twine with each other under a force during the descent and affecting subsequent installation.

7. In the annular anchor installing instrument provided by the present disclosure, the side wall of the installation tube is provided with the tube connecting portions, which are arranged in multiple groups in correspondence to the installation portion; the arrangement of the tube connecting portions is suitable for the connection with the annular anchor, adding the connection points for the anchor chain, avoiding the anchor chain from shaking on the side wall of the installation tube, further ensuring the stability of the installation instrument and the annular anchor afterwards bound with each other.

8. In the method for using the annular anchor installing instrument provided by the present disclosure, the installing instrument is bound with the annular anchor as a whole by means of the anchor chain, the pump body assembly during pumping and filling water enables the annular anchor to be installed to a certain depth below the seabed and the installing instrument to be recycled, the installation benefitting from the bearing performance of the deeper soil body is simple and speedy, and the installation instrument can be reused, reducing costs.

9. In the annular anchor installing method provided by the present disclosure, the hoist includes the first hoist and the second hoist, which are connected with the lifting portion and the installation portion, respectively; after the underwater robot removes the installation portion from the cover body, the second hoist lifts the installation portion and the anchor chain connected to it onto the surrounding seabed; during the final descent, the second hoist operates on the installation portion, and lifts the anchor chain to the surroundings, so as to facilitate the connection and anchoring between the parts to be subsequently moored and the anchor chain.

BRIEF DESCRIPTION OF THE DRAWINGS

To describe the embodiments of the present disclosure or the technical solutions in the prior art more clearly, the following briefly introduces the accompanying drawings required for describing the embodiments or the descriptions in the prior art. Apparently, the accompanying drawings in the following description show merely some embodiments of the present disclosure, and a person of ordinary skill in the art may still derive other drawings from these accompanying drawings without creative efforts.

Where, 1—annular anchor; 2—installation tube; 3—cover body; 4—pump body assembly; 5—lifting portion; 6—installation portions; 7—anchor chain; 8—constraint means; 9—constraint plate; 10—installing plate; 11—installation point; 12—lifting plate; 13—tube connecting portion; 14—first hoist; 15—second hoist.

DETAILED DESCRIPTION OF SOME EMBODIMENTS

The technical solutions in the embodiments of the present disclosure will be clearly and completely described as follows in combination with the drawings in the examples of the present disclosure, but obviously, the described examples are only a part of the embodiments of the present disclosure, rather than all the embodiments. Based on the examples of the present disclosure, all other examples obtained by a person skilled in the art without creative efforts shall fall within the protection scope of the present disclosure.

Furthermore, the technical features involved in different embodiments of the present disclosure described as follows can be combined with each other as long as they do not conflict with each other.

The annular anchor installing instrument provided by the present disclosure is configured to cooperatively install the annular anchor opened at its upper and lower ends.

As shown in FIGS. 1-4, one embodiment of the annular anchor installing instrument provided by this example includes the installation tube 2, the pump body assembly 4, the lifting portion 5 and the installation portion 6. One end of the installation tube 2 is provided with the cover body 3, and the other end of the installation tube 2 is configured to be an open end for cooperating with the top of the annular anchor 1. The height dimension of the installation tube 2 is greater than the distance dimension between the top of the installed annular anchor 1 and the seabed. The pump body assembly 4 is arranged on the cover body 3, and used to vacuum the interior of the installation tube 2. The lifting portion 5 is arranged on the cover body 3, and used to connect with a hoist. The installation portion 6 in multiple groups are removably arranged on the cover body 3, and used to connect with the hoist and the anchor chain 7 of the annular anchor 1, respectively, so that the annular anchor 1 is coaxially fixed to the open end of the installation tube 2 by connecting with the anchor chain 7 of the annular anchor 1.

The annular anchor 1 is fixed coaxially to the open end of the installation tube 2 by means of the anchor chain 7, and the pump body assemble 4 under control achieves pumping or filling water from/into the installation tube 2 and changes the pressure difference between the inside and outside of the installation tube 2, enabling the installation tube 2 to descend and rise. The height dimension of the installation tube 2 is greater than the distance dimension between the top of the installed annular anchor 1 and the seabed. The height of the installation tube 2 can increase, avoiding the installation tube 2 from being jammed with too high soil in the process of negative pressure penetration, and the soil from being sucked into the pump body assembly 4 to damage the equipment resultantly. The annular anchor 1 is sent below the seabed by means of the installation tube 2, achieving rapid installation under the pressure difference, which is convenient, fast and high-efficient, and the installation tube 2 can be recycled after installation and reused.

Specifically, the open end of the installation tube 2 is adapted to the shape of the top of the annular anchor 1 to be installed, and after the installation tube 2 and the annular anchor 1 are fixed with each other, the annular anchor 1 regarded as a part of the installation tube 2 can sink together with the installation tube 2 for installation. The lifting portion 5 and the installation portion 6 can be configured to be a lifting lug structure for respective connection with the hoist and the anchor chain.

Figure 1:
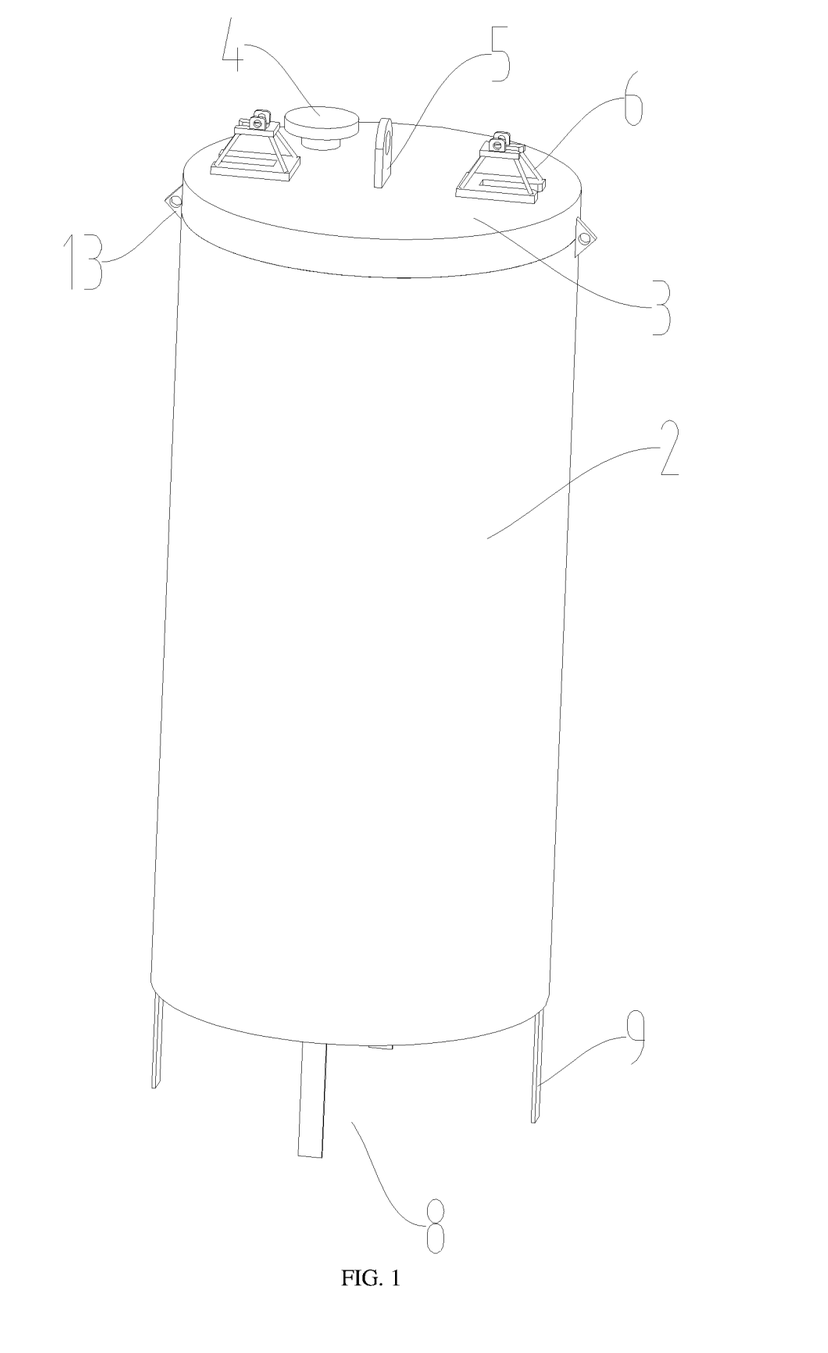
FIG. 1 is a structural schematic view of one specific embodiment of the annular anchor installing instrument provided in the example of the present disclosure.
Figure 2:
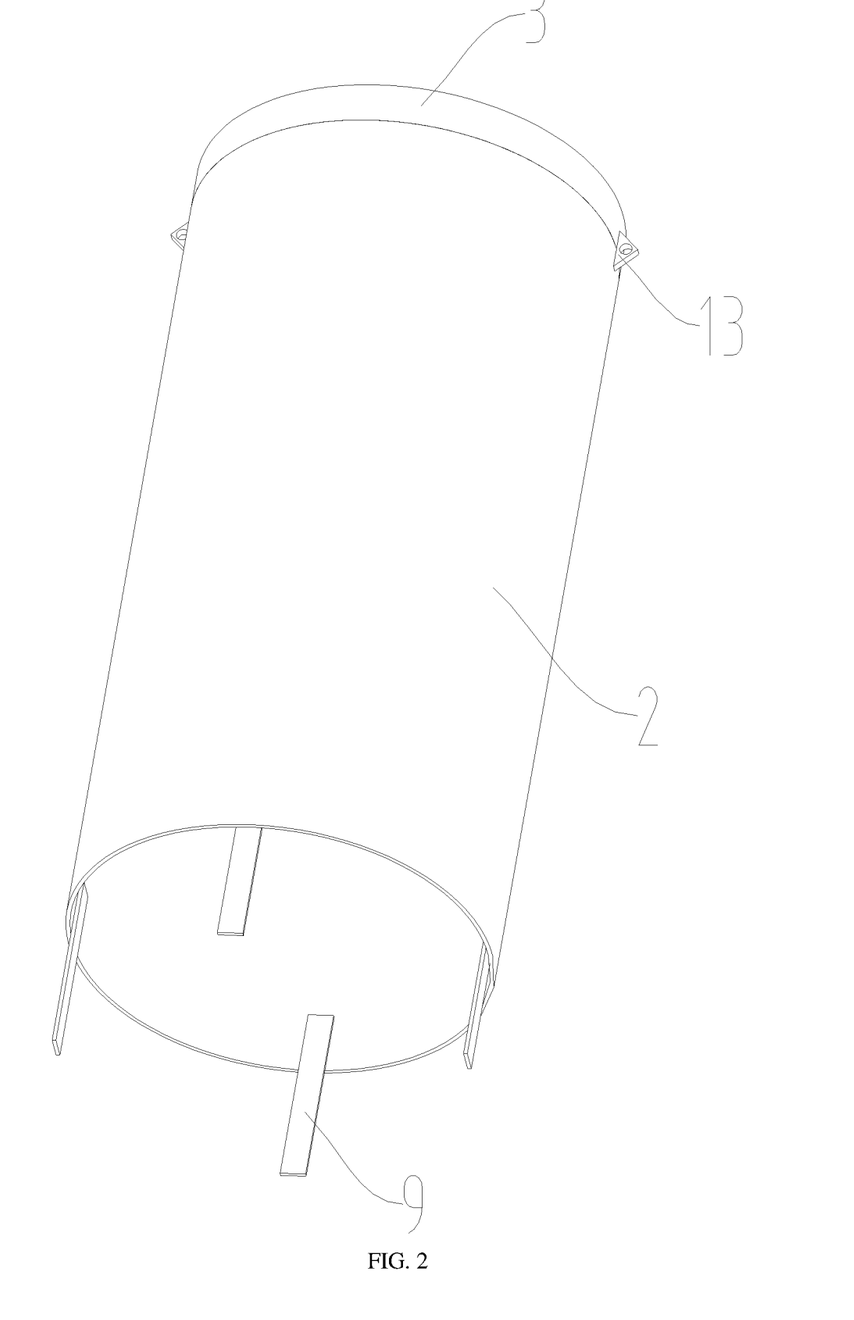
FIG. 2 is a structural schematic view of the annular anchor installing instrument in FIG. 1 at another angle of view.

As shown in FIGS. 1-2, the annular anchor installing instrument provided by this example also includes the constraint means 8, positioned at the open end of the installation tube, which is used to limit the relative movement between the annular anchor 1 and the installation tube 2 in the radial direction, so as to avoid misalignment between the annular anchor 1 and the annular anchor installing instrument in the process of the descent of the annular anchor 1 driven by the annular anchor installing instrument, causing excessive resistance to the descent, and affecting the penetration effect.

As shown in FIGS. 1-2, in the annular anchor installing instrument provided by this example, the constraint means 8 includes the constraint plate 9, one end of which is connected with the inner wall of the open end of the installation tube 2, and the other end of which is suitable for protruding into the interior of the annular anchor 1, so as to abut on the inner wall of the annular anchor 1, avoiding the annular anchor from shaking during movement, with a simple structure and high stability. Specifically, the constraint plate 9 may be configured to be a rectangular structure, or a curved plate structure adapted to the inner wall of the annular anchor 1. In addition, as an alternative embodiment, one end of the constraint plate 9 may also be arranged on the outer wall of the open end of the installation tube 2, the other end of the constraint plate 9 abuts on the outer wall of the annular anchor 1, so as to constrain the movement of the annular anchor 1 from the outside of the annular anchor 1.

This example provides multiple groups of constraint plates 9, which are spaced along the circumferential direction of the installation tube 2, guaranteeing the constraint on the annular anchor 1 in all directions. In addition, as an alternative embodiment, the constraint plate 9 can also be configured to be a group of cylindrical structures.

The end face of the open end of the installation tube 2 and the end face of the annular anchor 1 provided by this example are butted and abutted to each other, avoiding the movement of the annular anchor 1 in its axial direction during installation from affecting installation efficiency.

Figure 3:
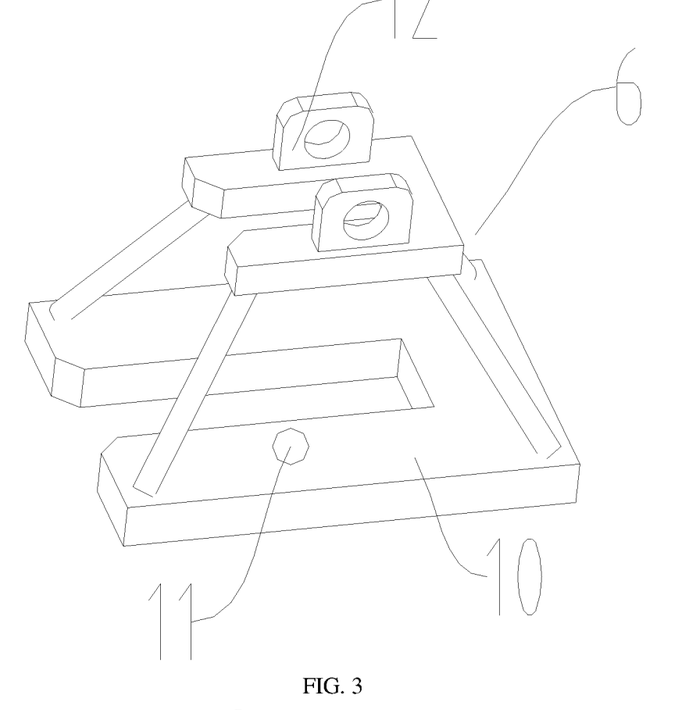
FIG. 3 is a structural schematic view of the installation portion in FIG. 1.
Figure 4:
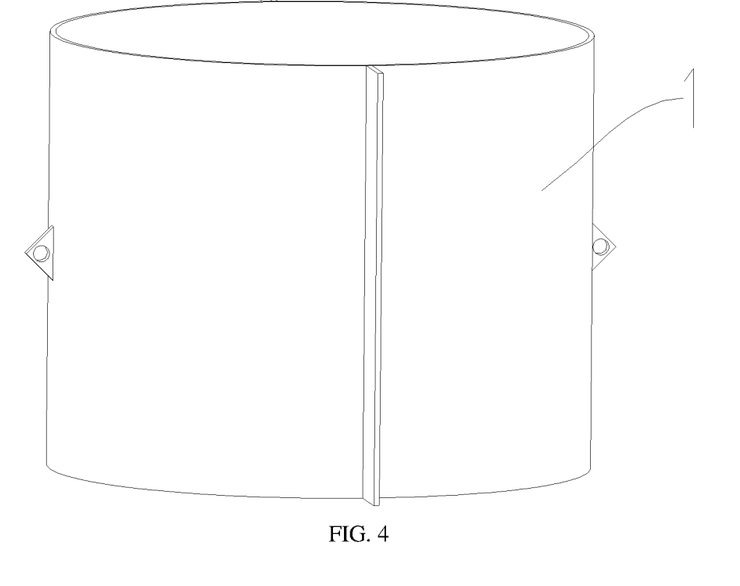
FIG. 4 is a structural schematic view of the annular anchor.

As shown in FIGS. 1 and 3, in the annular anchor installing instrument provided by this example, the installation portion 6 includes the installing plate 10 and the lifting plate 12; the installing plate 10 is connected with the cover body 3, and the installation point 11 is set on the installing plate 10; the lifting plate 12 is connected to the installing plate 10, and used to connect with a hoist. During the descent, the hoist can control the free end of the anchor chain 7 through the control of the lifting plate 12 and adjust well the position of the anchor chain 7, so as to facilitate the connection between the parts to be subsequently moored and the anchor chain 7. Specifically, the installation point 11 may be configured to be a lifting lug structure, and the lifting plate 12 is provided with a lifting lug structure.

A winch means set on the installation point provided by this example, which may be a winch, can receive the long anchor chain 7, avoiding multiple groups of anchor chains 7 after becoming too long, from moving to twine with each other under a force during the descent and affecting the subsequent installation.

As shown in FIGS. 1-2, in the annular anchor installing instrument provided by this example, the side wall of the installation tube 2 is provided with the tube connecting portions 13, which are arranged in multiple groups in correspondence to the installation portion 13. The arrangement of the tube connecting portions 13 is suitable for the connection with the annular anchor 7, adding the connection points for the anchor chain 7, avoiding the anchor chain 7 from shaking on the side wall of the installation tube 2, further ensuring the stability of the installation instrument and the annular anchor 1 afterwards bound with each other.

Figure 5:
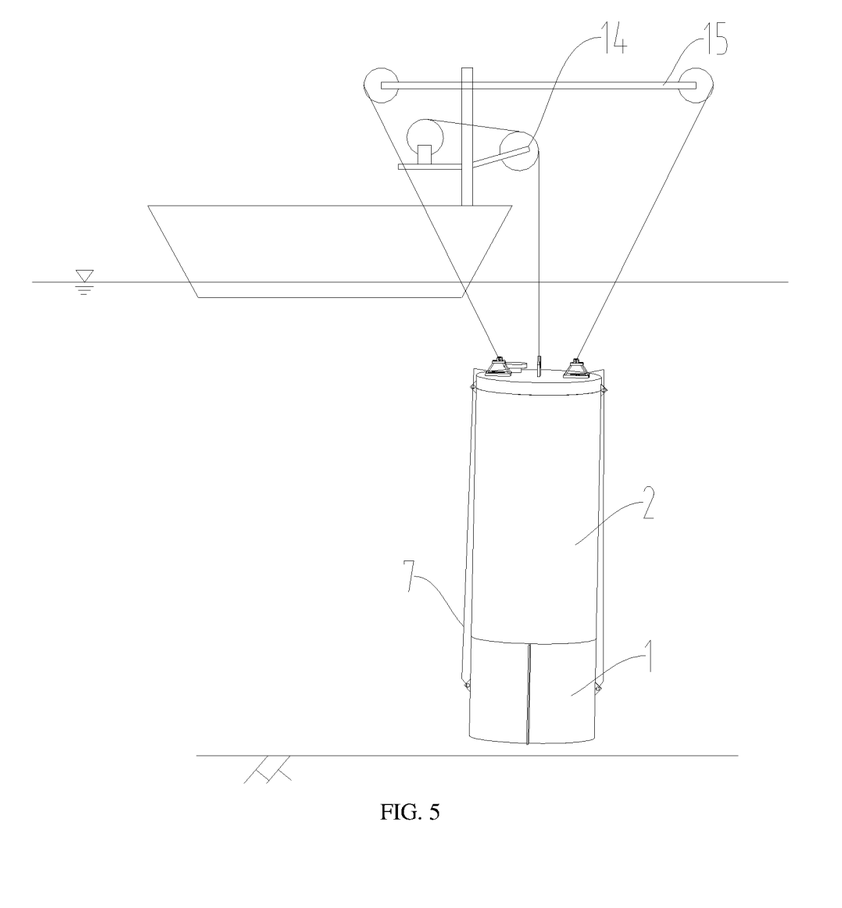
FIG. 5 is a structural schematic view of the annular anchor installing instrument and the annular anchor having been butted and fixed to each other and sunk into water.
Figure 6:
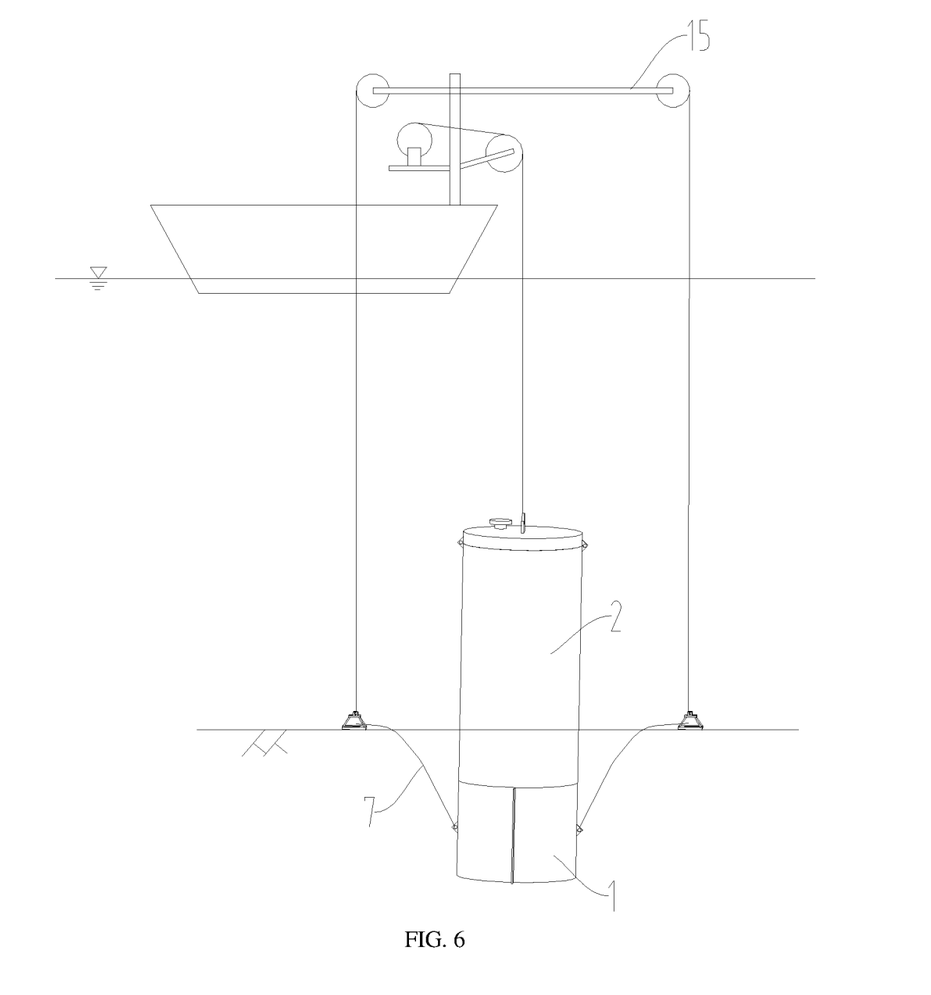
FIG. 6 is a structural schematic view of the annular anchor shown in FIG. 5 having reached a pointed position.
Figure 7:
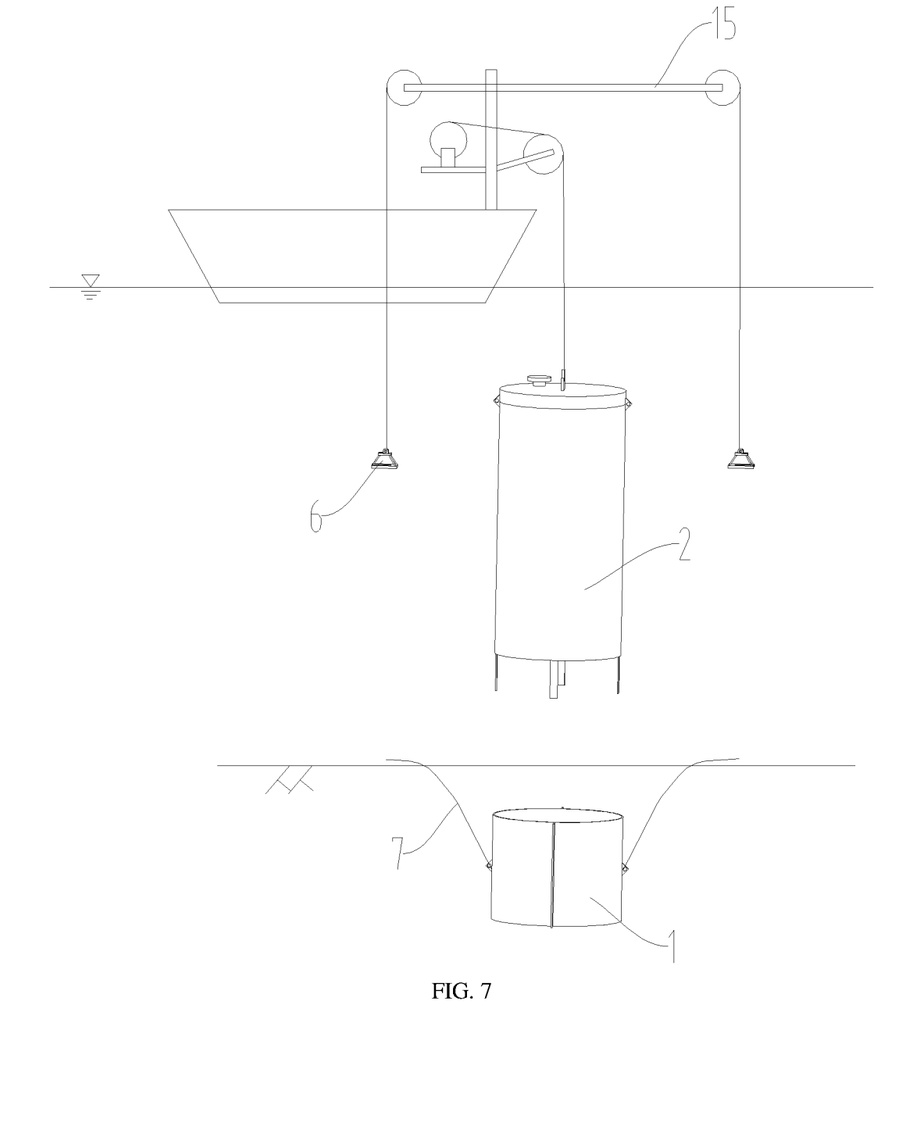
FIG. 7 is a structural schematic view of the installation tube being pulled out of the seabed by a hoist in FIG. 6.

As shown in FIGS. 5-7, the annular anchor installing method further provided by this example uses the annular anchor installing instrument described in the aforementioned example, including the following steps.

Butting the open end of the installation tube 2 to the top of the annular anchor 1, and connecting the anchor chain 7 on the annular anchor 1 with the installation portion 6 on the cover body 3, so that the annular anchor 1 is fixed coaxially to the open end of the installation tube 2.

Connecting a hoist with the lifting portion 5 on the cover body 3, then hoisting the annular anchor 1 and the annular anchor installing instrument into the water by means of the hoist to sink them, as shown in FIG. 5.

During the descent, actuating the pump body assembly 4 to drain the water in the installation tube 2 until the annular anchor 1 is in contact with the seabed.

Removing the installation portion 6 from the cover body 3 by means of an underwater robot, and hoisting the installation portion 6 and the anchor chain 7 connected to it onto the surrounding seabed by means of a hoist.

Pumping water from the installation tube 2 by means of the pump body assembly 4, so that the annular anchor 1 sinks down to the designed depth of the seabed under negative pressure, as shown in FIG. 6.

Starting the pump body assembly 4 to fill water into the installation tube 2 for a pressure boost, meanwhile cooperating with a hoist to pull the installation tube 2 out of the seabed, leaving the annular anchor 1 under the seabed, as shown in FIG. 7.

The installing instrument is bound with the annular anchor 1 as a whole by means of the anchor chain 7, the pump body assembly 4 during pumping and filling water enables the annular anchor 1 to be installed to a certain depth below the seabed and the installing instrument to be recycled, the installation benefitting from the bearing performance of the deeper soil body is simple and speedy, and the installation instrument can be reused, reducing costs.

As shown in FIGS. 1-3, in the annular anchor installing method provided by this example, the hoist includes the first hoist 14 and the second hoist 15, the lifting portion 5 on the cover body 3 is connected with the first hoist 14, and the lifting plate 12 of the installation portion 6 is connected with the second hoist 15.

After the underwater robot removes the installation portion 6 from the cover body 3, the second hoist 15 lifts the installation portion 6 and the anchor chain 7 connected to it onto the surrounding seabed, so as to facilitate the connection and anchoring between the parts to be subsequently moored and the anchor chain 7.

It is obvious that the above description only gives examples for clarity, which does not impose a limitation on their embodiments. A person skilled in the art can make various changes or modifications on the basis of the above description. There is no need and inability to give all exhaustive embodiments. However, the apparent changes or modifications derived therefrom still fall within the protection scope of the present disclosure.

What is claimed is:

1. An annular anchor installing instrument configured to cooperatively install an annular anchor (1) opened at its upper and lower ends, comprising
    an installation tube (2), one end of which is provided with a cover body (3), and an other end of which is configured to be an open end for cooperating with the top of the annular anchor (1);
    a pump body assembly (4) arranged on said cover body (3), and used to vacuum the interior of said installation tube (2);
    a lifting portion(S) arranged on said cover body (3), and used to connect with a hoist; and
    installation portions (6) which are removably arranged on said cover body (3), and used to connect with the hoist and the anchor chain (7) of the annular anchor (1), respectively, so that the annular anchor (1) is coaxially fixed to the open end of said installation tube (2) by connecting with the anchor chain (7) of the annular anchor (1);
    wherein the hoist includes a first hoist (14) and a second hoist (15), the lifting portion(S) on the cover body (3) is connected with the first hoist (14), and the lifting plate (12) of the installation portion (6) is connected with the second hoist (15);
    after the installation portions (6) is detached from the cover body (3) by a underwater robot, the second hoist (15) places the installation portion (6) and the anchor chain (7) onto a surface of surrounding seabed.

2. The annular anchor installing instrument according to claim 1, wherein it further includes a constraint means (8), positioned at the open end of said installation tube (2), which is used to limit a relative movement between the annular anchor (1) and said installation tube (2) in a direction.

3. The annular anchor installing instrument according to claim 2, wherein said constraint means (8) includes a constraint plate (9), one end of which is connected with the inner wall of the open end of said installation tube (2), and the other end of which is suitable for protruding into the interior of the annular anchor (1), so as to abut on the inner wall of the annular anchor (1).

4. The annular anchor installing instrument according to claim 3, wherein said constraint plates (9) are configured to be in multiple groups, which are spaced along the circumferential direction of said installation tube (2).

5. The annular anchor installing instrument according to claim 1, wherein the end face of the open end of said installation tube (2) and the end face of the annular anchor (1) are butted to each other.

6. The annular anchor installing instrument according to claim 1, wherein said installation portion (6) includes an installing plate (10), which is connected with said cover body (3), and on which a installation point (11) is set;
    and a lifting plate (12) connected to said installing plate (10), and used to connect with a hoist.

7. The annular anchor installing instrument according to claim 1, wherein the side wall of said installation tube (2) is provided with tube connecting portions (13), which are arranged in multiple groups in correspondence to said installation portion (6) and connected to said installation portion (6) by the anchor chain (2).

8. An annular anchor installing method using the annular anchor installing instrument described in claim 1, comprising the steps of:
    butting the open end of said installation tube (2) to the top of the annular anchor (1), and connecting the anchor chain (7) on the annular anchor (1) with said installation portion (6) on said cover body (3), so that the annular anchor (1) is fixed coaxially to the open end of said installation tube (2);
    connecting a hoist with said lifting portion (5) on said cover body (3), then hoisting the annular anchor (1) and the annular anchor installing instrument into water by means of the hoist to sink them;
    during the descent, actuating said pump body assembly (4) to drain water in said installation tube (2) until the annular anchor (1) is in contact with a seabed, removing said installation portion (6) from said cover body (3) by means of an underwater robot, and hoisting said installation portion (6) and the anchor chain (7) connected to it onto the surrounding seabed by means of a hoist;

pumping water from said installation tube (2) by means of said pump body assembly (4), so that the annular anchor (1) sinks down to a designed depth of the seabed under negative pressure; and starting said pump body assembly (4) to fill water into said installation tube (2) for a pressure boost, meanwhile cooperating with a hoist to pull said installation tube (2) out of the seabed, leaving the annular anchor (1) under the seabed.

9. The annular anchor installing instrument according to claim 2, wherein the side wall of said installation tube (2) is provided with tube connecting portions (13), which are arranged in multiple groups in correspondence to said installation portion (6) and connected to said installation portion (6) by the anchor chain (7).

10. The annular anchor installing instrument according to claim 3, wherein the side wall of said installation tube (2) is provided with tube connecting portions (13), which are arranged in multiple groups in correspondence to said installation portion (6) and connected to said installation portion (6) by the anchor chain (7).

11. The annular anchor installing instrument according to claim 4, wherein the side wall of said installation tube (2) is provided with tube connecting portions (13), which are arranged in multiple groups in correspondence to said installation portion (6) and connected to said installation portion (6) by the anchor chain (7).

12. The annular anchor installing instrument according to claim 5, wherein the side wall of said installation tube (2) is provided with tube connecting portions (13), which are arranged in multiple groups in correspondence to said installation portion (6) and connected to said installation portion (6) by the anchor chain (7).

13. The annular anchor installing instrument according to claim 6, wherein the side wall of said installation tube (2) is provided with tube connecting portions (13), which are arranged in multiple groups in correspondence to said installation portion (6) and connected to said installation portion (6) by the anchor chain (7).

14. The annular anchor installing instrument according to claim 1, wherein the side wall of said installation tube (2) is provided with tube connecting portions (13), which area arranged in multiple groups in correspondence to said installation portion (6) and connected to said installation portion (6) by the anchor chain (7).

15. The annular anchor installing instrument according to claim 8, wherein it further includes a constraint means (8), positioned at the open end of said installation tube (2), which is used to limit a relative movement between the annular anchor (1) and said installation tube (2) in a radial direction.

16. The annular anchor installing instrument according to claim 8, wherein said constraint means (8) includes a constraint plate (9), one end of which is connected with the inner wall of the open end of said installation tube (2), and the other end of which is suitable for protruding into the interior of the annular anchor (1), so as to abut on the inner wall of the annular anchor (1).

17. The annular anchor installing instrument according to claim 8, wherein said constraint plates (9) are configured to be in multiple groups, which are spaced along the circumferential direction of said installation tube (2).

18. The annular anchor installing instrument according to claim 8, wherein the end face of the open end of said installation tube (2) and the end face of the annular anchor (1) are butted to each other.

\* \* \* \* \*